Patented Nov. 8, 1938

2,135,593

UNITED STATES PATENT OFFICE 2,135,593

SOY BEAN NUTS

Irving A. Nohe, Chicago, Ill., assignor to Soy Bean Products Co., a corporation of Illinois No Drawing. Application October 2, 1935, Serial No. 43,285

6 Claims. (Cl. 99—98)

This invention relates to soy bean nuts and more particularly to an improved method for processing soy beans to produce nuts.

I am aware of the fact that there have been several attempts heretofore to make palatable nuts from soy beans. In such earlier processes, the beans have been soaked in water and cooked or fried in oil. I am also aware of the fact that many attempts have been made to remove the disagreeable taste of soy beans before processing the soy beans to form flour and other products. As far as I have been able to ascertain, the nuts heretofore produced from soy beans have not been palatable and have not had the characteristics of nuts which I have been able to produce in my finished product, and I attribute such failure to the omission of certain steps which I have found to be vital and necessary.

In the practice of my invention, I place a suitable quantity of soy beans in large vessels, preferably crocks, and allow the beans to soak in water for a period of from fifteen to eighteen hours after which time the beans are placed upon racks and allowed to drain. This prolonged step of the stated duration causes the beans to absorb substantially 120% water by weight and causes them to swell to a marked extent, the duration of soaking being such that if the beans were thereafter completely dried they would not return to their original size; in other words, they are stretched beyond their elastic limit. This step is a necessary one if the finished product is not to be hard and unpalatable.

The beans, after draining, are placed in kettles. Over the beans is poured a heavy solution of sodium chloride, the solution being of such character as to impart to the beans in their finished nut-like form the desired salty taste, after the herein disclosed invention is practiced. The beans are boiled in the brine for approximately one and one-fourth hours to one and one-half hours, the length of boiling being determined by the variety of bean used. The beans are boiled slowly. I prefer to raise the temperature of the brine slowly from 70° F. to the boiling temperature. While the beans are boiling, the outer shell or skin of the bean comes off and floats to the top of the vessel. Also, a frothy white material floats to the top, the skins and frothy material forming a rather thick layer on the surface. The thick layer of material is removed from time to time during the boiling operation.

After the boiling and skinning steps, the beans are placed on racks and allowed to drain. If the product is tested at this stage, it is found that the bitter or unpleasant taste of the bean has entirely disappeared.

The boiled beans, after draining, are next placed in a deep fat frier containing coco-nut oil or other suitable oils. The temperature of the coco-nut oil at the time the beans are immersed in the oil is approximately 400° F. After the introduction of the beans, the temperature of the oil drops quickly to a rather low temperature as the moisture leaves the beans. With a constant heat input, the temperature of the oil rises again until it reaches from 305° F. to 315° F. The time required for the temperature to build up again to those named above varies with the quantity of moisture in the beans and I have found that the period required is ordinarily between eight to eighteen minutes. In the practice of my process, I do not permit the temperature to go above 315° F. and I prefer to remove the beans at some point between 305° and 315° F. If the temperature rises substantially above 315° F., I have found that the product is not satisfactory. When the product is removed, it has a dark brown color. I prefer to add a suitable flavoring material to the coco-nut oil in which the beans are fried.

After the beans are removed from the coco-nut oil, they are supported in racks and the oil allowed to drain back into the frying machine. From the racks, the beans are placed in a rotating screen cylinder or any other suitable device and tumbled therein to remove the skins from the bean or nut. In the cylinder a large-mesh screen is employed which permits the thin skins removed from the nuts to fall through the screen and into a receiving bin. The skin thus removed is a finer and thinner skin than that initially removed in the boiling operation and is apparently an inner or second skin. After the skins have been removed in the rotating cylinder, the nuts are removed from the cylinder and packaged, or placed in barrels etc.

In the process as above outlined, I have found it to be of great importance to boil the beans for a substantial period and while boiling them in a salt solution to skim off the shells and white material which floats upon the top of the liquid. This step of boiling and skimming apparently conditions the product for the subsequent frying step and enables me to produce a bean having a delicious nut-like taste and the brittle tender consistency of freshly roasted nuts. The final step of removing the second or inner skin gives the finished product a uniform texture throughout its cross-section.

While in the foregoing description I have set out certain steps and treatments, it will be understood that a number of changes and variations can be made in them without departing from the spirit of my invention.

The foregoing detailed description has been given for clearness of understanding only, and no unnecessary limitations should be understood therefrom, but the appended claims should be construed as broadly as permissible, in view of the prior art.

I claim:

1. The method of processing soy beans comprising: soaking the beans in water sufficiently to enlarge them until they absorb substantially 120% water by weight, boiling the beans in brine, removing the material floating to the top of the brine, and frying the boiled beans in oil.

2. The method of processing soy beans comprising: soaking the beans in water for a substantial period of time until they absorb substantially 120% water by weight, boiling the same in a flavored liquid for a period in the neighborhood of one hour to impart said flavor to said beans, removing the light material floating to the top of the boiling liquid, and frying the boiled beans in oil.

3. The method of processing soy beans comprising: soaking the beans in water for a substantial period until they absorb substantially 120% water by weight, boiling the beans in a flavored liquid to impart said flavor to said beans, immersing the boiled beans in hot oil at the temperature of approximately 400° F. and frying the beans to a desired brown color.

4. The method of processing soy beans comprising: soaking the beans in water, boiling the beans in brine, removing the material floating to the top of the brine, immersing the beans in oil raised to the temperature of approximately 400° F., and raising the temperature of the oil which drops upon the introduction of said beans, to a temperature of from 305° F. to 315° F. and removing the beans when the oil is between the temperatures of 305° F. and 315° F.

5. The method of processing soy beans comprising: soaking the beans in water for a substantial time until they absorb substantially 120% water by weight, placing the beans in brine, raising the temperature of the brine from approximately 70° F. to boiling temperature, removing the material floating to the top of the brine, and frying the boiled beans in oil.

6. The method of processing soy beans to produce nuts, comprising: soaking for a substantial period of time until they absorb substantially 120% of the liquid in which they are soaked by weight, boiling the beans in brine, removing the skins of said beans, frying the boiled beans in oil, and then removing the second skins of said beans.

IRVING A. NOHE.